US012664028B2

(12) United States Patent
Li et al.

(10) Patent No.: US 12,664,028 B2
(45) Date of Patent: Jun. 23, 2026

(54) CAPACITY ADJUSTMENT METHOD AND APPARATUS, SYSTEM, AND COMPUTING DEVICE

(71) Applicant: HUAWEI TECHNOLOGIES CO., LTD., Shenzhen (CN)

(72) Inventors: Guangcheng Li, Beijing (CN); Xi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 18/151,224

(22) Filed: Jan. 6, 2023

(65) Prior Publication Data

US 2023/0153172 A1     May 18, 2023

Related U.S. Application Data

(63) Continuation of application No. PCT/CN2021/087946, filed on Apr. 17, 2021.

(30) Foreign Application Priority Data

Jul. 7, 2020     (CN) .......................... 202010643722.4
Dec. 29, 2020     (CN) .......................... 202011605276.4

(51) Int. Cl.
*G06F 9/50*          (2006.01)

(52) U.S. Cl.
CPC .......... *G06F 9/5077* (2013.01); *G06F 9/5033* (2013.01)

(58) Field of Classification Search
CPC ...................................................... G06F 9/5077
USPC ........................................................ 719/338
See application file for complete search history.

(56) References Cited

U.S. PATENT DOCUMENTS

| | | | | |
|---|---|---|---|---|
| 10,063,427 B1* | 8/2018 | Brown | .................... | H04L 41/12 |
| 10,411,960 B1* | 9/2019 | Jones | .................... | H04L 41/082 |
| 11,113,120 B1* | 9/2021 | Greenfield | ........... | G06F 9/4881 |
| 11,748,164 B2* | 9/2023 | Zhang | .................. | G06F 9/5077 |
| | | | | 718/104 |
| 11,886,932 B1* | 1/2024 | Dasgupta | .............. | G06F 9/4881 |
| 2014/0344810 A1* | 11/2014 | Wang | .................... | G06F 9/5072 |
| | | | | 718/1 |
| 2015/0281113 A1* | 10/2015 | Siciliano | .............. | G06F 9/5072 |
| | | | | 709/226 |
| 2016/0063014 A1* | 3/2016 | Chelur | ................ | G06F 11/1456 |
| | | | | 707/649 |

(Continued)

FOREIGN PATENT DOCUMENTS

CN          106293868 A          1/2017

OTHER PUBLICATIONS

Extended European Search Report in European Appln. No. 21838488.1, mailed on Jul. 7, 2023, 6 pages.

(Continued)

*Primary Examiner* — Mehran Kamran
(74) *Attorney, Agent, or Firm* — Fish & Richardson P.C.

(57) ABSTRACT

Example capacity adjustment methods, computing devices, and computer storage media are provided. One example capacity adjustment method includes creating a scaling group. A first instance is created on a first server set for the scaling group. A second instance is created on a second server set for the scaling group. A quantity of instances deployed on the first server set for the scaling group is limited by an upper limit value.

20 Claims, 8 Drawing Sheets

Scaling group

| Instance 11 that uses an X86 processor | Instance 12 that uses an ARM processor | Instance 13 that uses the X86 processor | Instance 14 that uses the ARM processor | Instance 15 that uses the X86 processor |
|---|---|---|---|---|

Current instance quantity

Minimum instance quantity

Maximum instance quantity

(56)        References Cited

U.S. PATENT DOCUMENTS

| | | | | |
|---|---|---|---|---|
| 2016/0164738 A1* | 6/2016 | Pinski | ................... | G06F 9/5061 |
| | | | | 709/224 |
| 2016/0323377 A1* | 11/2016 | Einkauf | .............. | H04L 67/1031 |
| 2017/0052772 A1* | 2/2017 | Chen | ................... | G06F 9/45558 |
| 2017/0237618 A1* | 8/2017 | Jones | ...................... | G06F 9/547 |
| | | | | 709/221 |
| 2017/0308401 A1* | 10/2017 | Argenti | ................ | G06F 9/5027 |
| 2018/0039516 A1* | 2/2018 | Biran | ................. | G06F 9/45558 |
| 2018/0295026 A1* | 10/2018 | Jones | ................. | H04L 67/1031 |
| 2018/0365006 A1* | 12/2018 | Carvalho | .................. | G06F 8/61 |
| 2019/0188185 A1* | 6/2019 | Lichtenberg | ........ | G06F 3/04842 |
| 2019/0251190 A1* | 8/2019 | Scrivano | .............. | G06F 16/162 |
| 2020/0336316 A1* | 10/2020 | Jain | ....................... | H04L 63/205 |
| 2020/0404051 A1* | 12/2020 | Guniguntala | ....... | H04L 67/1029 |
| 2021/0297504 A1* | 9/2021 | Acar | ....................... | H04L 67/10 |
| 2021/0357255 A1* | 11/2021 | Mahadik | ............. | G06F 11/3006 |
| 2022/0050719 A1* | 2/2022 | Wang | ................. | H04L 41/0886 |
| 2023/0153172 A1* | 5/2023 | Li | ......................... | G06F 9/5033 |
| | | | | 719/328 |

OTHER PUBLICATIONS

International Search Report and Written Opinion in International Appln. No. PCT/CN2021/087946, mailed on Jul. 15, 2021, 16 pages (with English translation).

EP Communication Pursuant to Article 94(3) EPC in European Appln. No. 21838488.1, mailed on Mar. 19, 2024, 6 pages.

* cited by examiner

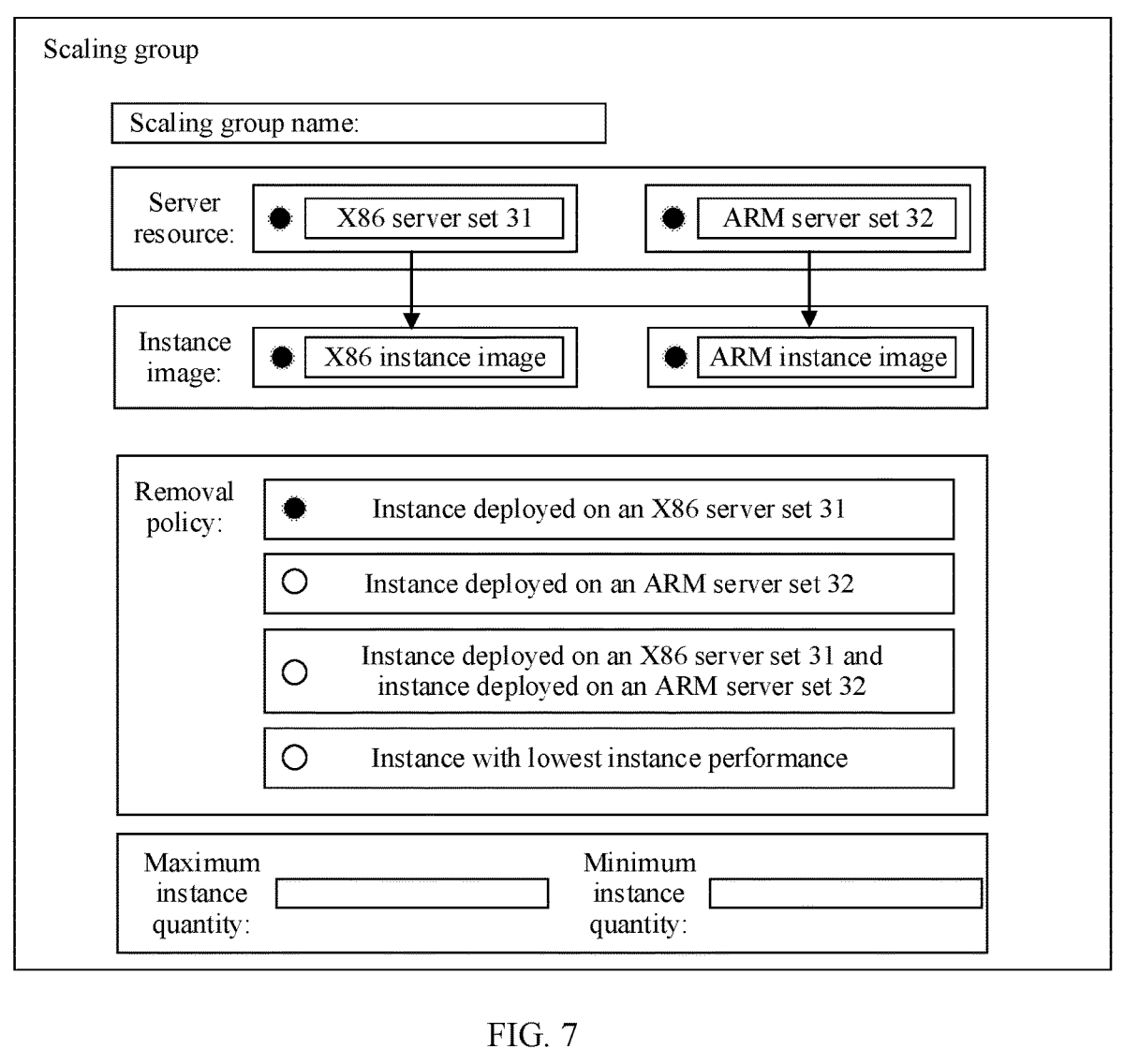

Scaling group

Scaling group name:

Server resource:
● X86 server set 31          ● ARM server set 32

Instance image:
● X86 instance image          ● ARM instance image

Removal policy:
● Instance deployed on an X86 server set 31

○ Instance deployed on an ARM server set 32

○ Instance deployed on an X86 server set 31 and instance deployed on an ARM server set 32

○ Instance with lowest instance performance

Maximum instance quantity:

Minimum instance quantity:

FIG. 7

CAPACITY ADJUSTMENT METHOD AND APPARATUS, SYSTEM, AND COMPUTING DEVICE

CROSS-REFERENCE TO RELATED APPLICATIONS

This application is a continuation of International Application No. PCT/CN2021/087946, filed on Apr. 17, 2021, which claims priority to Chinese Patent Application No. 202011605276.4, filed on Dec. 29, 2020, and claims priority to Chinese Patent Application No. 202010643722.4, filed on Jul. 7, 2020. All of the aforementioned patent applications are hereby incorporated by reference in their entireties.

TECHNICAL FIELD

This application relates to the computer field, and in particular, to a capacity adjustment method, a data node, a distributed database, a computing device, and a computer program product.

BACKGROUND

A public cloud manufacturer provides an auto scaling service, and by using the auto scaling service, capacity expansion or capacity reduction can be performed on a quantity of virtual machines in a scaling group. A quantity of instances in the scaling group has an upper limit value and a lower limit value. A maximum quantity of instances in the scaling group cannot exceed the upper limit value, and a minimum quantity of instances in the scaling group cannot be less than the lower limit value.

SUMMARY

In view of this, this application provides a capacity adjustment method and apparatus, a system, a computing device, a computer program product, and a nonvolatile storage medium, to limit an upper limit value of a quantity of instances created on a server cluster for a single scaling group, so that the scaling group can share a same server set with another scaling group.

According to a first aspect, this application provides a capacity adjustment method. A computing device performs the method. For example, the computing device creates a scaling group; the computing device creates a first instance on a first server set for the scaling group; and the computing device creates a second instance on a second server set for the scaling group, where a quantity of instances deployed on the first server set for the scaling group is limited by an upper limit value. In this way, the scaling group can share a first server cluster with another scaling group to implement auto scaling of respective scaling groups.

In a possible design of the first aspect, the quantity of instances deployed on the first server set for the scaling group is limited by a lower limit value. In this way, it can be ensured that the scaling group can effectively occupy a resource of the first server set to provide a service.

In a possible design of the first aspect, a quantity of instances deployed on the second server set for the scaling group is limited by an upper limit value. In this way, the scaling group can share a second server cluster with another scaling group to implement auto scaling of respective scaling groups.

In a possible design of the first aspect, a quantity of instances deployed on the second server set for the scaling group is limited by a lower limit value. In this way, it can be ensured that the scaling group can effectively occupy a resource of the second server set to provide a service.

In a possible design of the first aspect, a quantity of instances deployed on the second server set for the scaling group is limited by an upper limit value and a lower limit value. In this way, the scaling group can share a second server cluster with another scaling group to implement auto scaling of respective scaling groups. In addition, it can be ensured that the scaling group can effectively occupy a resource of the second server set to provide a service.

In a possible design of the first aspect, a processor of a server in the first server set is a reduced instruction set computer (RISC) processor, for example, the RISC processor may be an ARM processor. A processor of a server in the second server set is a complex instruction set computer (CISC) processor, for example, the CISC processor may be an X86 processor.

In a possible design of the first aspect, the computing device creates, on the first server set with the ARM processor, one or more instances that use the ARM processor. The computing device creates, on the second server set with the X86 processor, one or more instances that use the X86 processor. In this way, an instance may be deployed, based on a processor requirement of the instance, on a server set that meets the processor requirement.

In a possible design of the first aspect, the scaling group includes a third instance and a fourth instance, the third instance is an instance of a virtual machine type, and the fourth instance is an instance of a container type. In other words, a part of instances included in the scaling group are virtual machines, and a part of instances included in the scaling group are containers, that is, the scaling group includes a plurality of types of heterogeneous instances. In this way, a requirement of a customer for an instance can be met, or a requirement of a service for an instance can be met.

In a possible design of the first aspect, an instance image used to create an instance on the first server set for the scaling group is different from an instance image used to create an instance on the second server set for the scaling group. For example, an instance image used to create, on the first server set with the ARM processor, an instance that uses the ARM processor is different from an instance image used to create, on the second server set with the X86 processor, an instance that uses the X86 processor.

To be specific, heterogeneous server sets support instance creation by using different instance images.

In a possible design of the first aspect, an instance image used to create an instance on the first server set for the scaling group is the same as an instance image used to create an instance on the second server set for the scaling group. For example, an instance image used to create, on the first server set with the ARM processor, an instance that uses the ARM processor and an instance image used to create, on the second server set with the X86 processor, an instance that uses the X86 processor are a same image of a Linux system.

In a possible design of the first aspect, the computing device adjusts instance deployment of the scaling group on the first server set and the second server set.

In other words, when an instance in the scaling group needs to be adjusted, the instance is specifically adjusted by adjusting instance deployment on the first server set and the second server set. For example, when capacity expansion needs to be performed on the scaling group, a newly added instance may be created on the first server set and the second server set. For example, when capacity reduction needs to be performed on the scaling group, instances on the first server set and the second server set may be reduced.

In a possible design of the first aspect, when capacity expansion is performed on the scaling group, an instance is created on the first server set with low instance costs. When capacity reduction is performed on the scaling group, an instance is removed from the second server set with high instance costs. In this way, costs of the scaling group can be reduced.

In a possible design of the first aspect, when capacity expansion is performed on the scaling group, an instance is created on the second server set with high instance performance. When capacity reduction is performed on the scaling group, an instance is removed from the first server set with low instance performance. In this way, overall performance of the scaling group can be improved.

In a possible design of the first aspect, when capacity expansion is performed on the scaling group, an instance is created on the second server set with low resource utilization. When capacity reduction is performed on the scaling group, an instance is removed from the first server set with high resource utilization. In this way, resource utilization of the scaling group in the server sets can be adjusted properly, to ensure service stability and improve service performance.

In a possible design of the first aspect, the quantity of instances deployed on the first server set for the scaling group and the quantity of instances deployed on the second server set for the scaling group are maintained at a ratio or near the ratio. For example, when capacity expansion is performed on the scaling group, a quantity of new instances created on the first server set and a quantity of new instances created on the second server set for the scaling group are determined based on the ratio. For example, when capacity reduction is performed on the scaling group, a quantity of old instances reduced on the first server set and a quantity of old instances reduced on the second server set for the scaling group are determined based on the ratio.

According to a second aspect, this application provides a capacity adjustment apparatus. The apparatus includes a plurality of functional modules, configured to implement different steps of the method provided in any one of the first aspect or the possible designs of the first aspect.

According to a third aspect, this application provides a system, where the system includes a first server set, a second server set, and a computing device configured to perform the capacity adjustment method provided in any one of the first aspect or the possible designs of the first aspect.

This application provides a system, and the system includes a first server set, a second server set, and the apparatus provided in the second aspect.

According to a fourth aspect, this application provides a computing device, where the computing device includes a processor and a memory. The processor executes instructions stored in the memory, so that the computing device performs the method provided in the first aspect or various possible designs of the first aspect.

This application provides a computing device, where the computing device includes a processor and a memory. The processor executes instructions stored in the memory, so that the computing device implements the apparatus provided in the second aspect.

According to a fifth aspect, this application provides a computer-readable storage medium, where the computer-readable storage medium stores instructions, and when a processor of a computing device executes the instructions, the computing device performs the method provided in the first aspect or various possible designs of the first aspect.

This application provides a computer-readable storage medium. The computer-readable storage medium stores instructions. When a processor of a computing device executes the instructions, the computing device implements the apparatus provided in the second aspect.

According to a sixth aspect, this application provides a computer program product. The computer program product includes instructions. The instructions are stored in a computer-readable storage medium. A processor of a computing device may read the instructions from the computer-readable storage medium. The processor executes the instructions, so that the computing device performs the method provided in the first aspect or various possible designs of the first aspect.

This application provides a computer program product. The computer program product includes instructions. The instructions are stored in a computer-readable storage medium. A processor of a computing device may read the instructions from the computer-readable storage medium. The processor executes the instructions, so that the computing device implements the apparatus provided in the second aspect.

BRIEF DESCRIPTION OF DRAWINGS

FIG. 7 is a schematic diagram of configuration of a scaling group according to an example of this application;

DESCRIPTION OF EMBODIMENTS

The following describes technical solutions provided in this application with reference to the accompanying drawings in this application.

A scaling group is a set of instances. An instance in the scaling group may be a virtual machine (VM), or an instance in the scaling group may be a container, or an instance in the scaling group may be another entity that provides a computing capability. In a possible implementation of the scaling group, all instances included in the scaling group are of a same instance type. For example, all instances included in the scaling group are virtual machines. For another example, all instances included in the scaling group are containers. In a possible implementation of the scaling group, the scaling group includes a plurality of instances of different instance types. For example, a part of instances included in the scaling group are virtual machines, and another part of instances included in the scaling group are containers.

Figure 1:
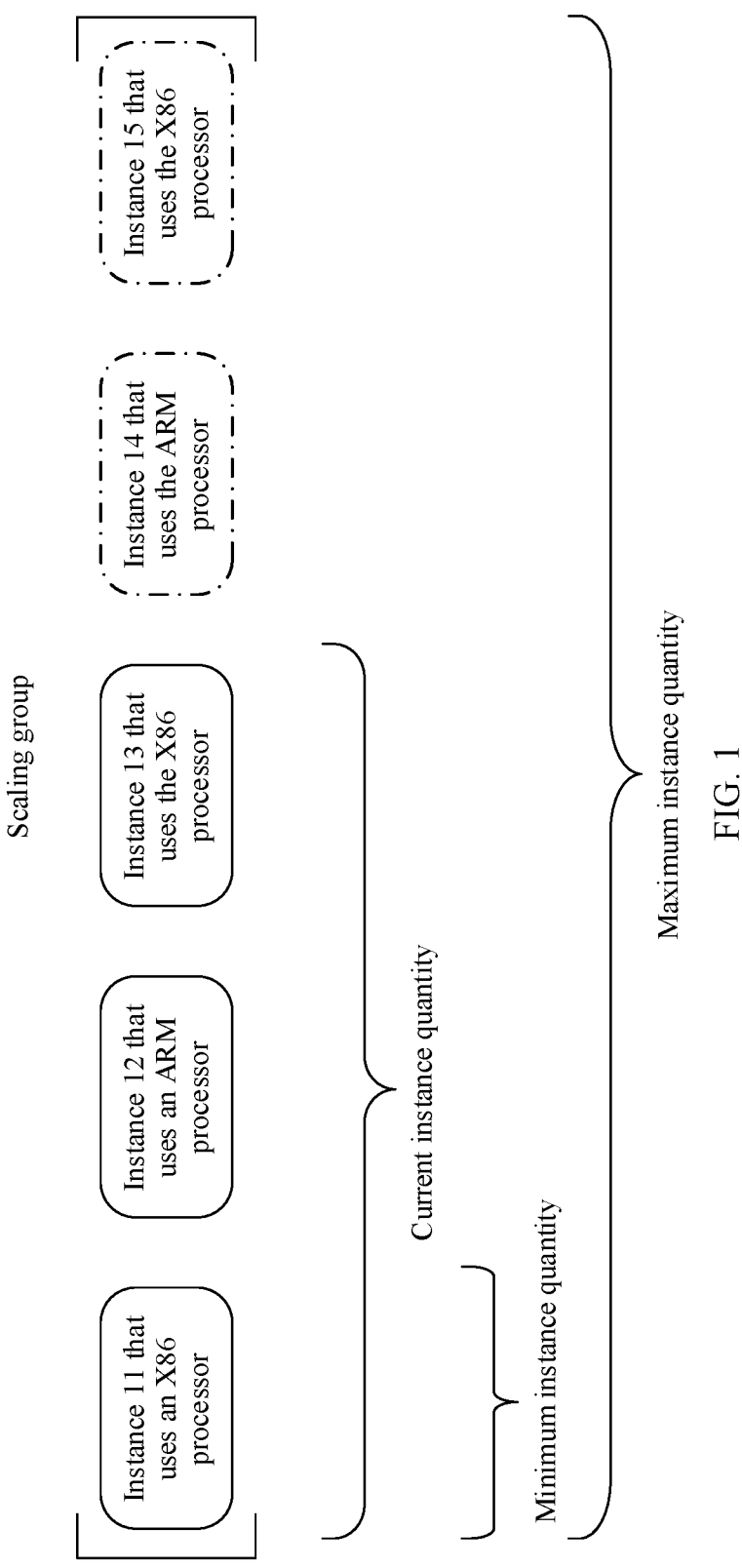
FIG. 1 is a schematic diagram of a scaling group according to an example of this application.

In a possible implementation of the scaling group, a minimum instance quantity and a maximum instance quantity are configured for the scaling group. The minimum instance quantity is a minimum quantity of instances that the scaling group has, and the maximum instance quantity is a maximum quantity of instances that the scaling group has. For example, as shown in FIG. 1, a scaling group is established for a web page access application. A user may configure a minimum instance quantity and a maximum instance quantity for the scaling group. The minimum instance quantity configured for the scaling group is 1 to support a small quantity of users in accessing a web page, and the maximum instance quantity configured for the scaling group is 5 to support a large quantity of users in accessing a web page. To match a current user quantity that supports web page access, a current quantity of instances in the scaling group is automatically scaled to 3.

In the scaling group, instances of a same processor type may be created, or instances of different processor types may be created.

The processor type includes the following two or more types:

an X86 processor;

an X86 processor and a graphics processing unit (GPU);

an X86 processor and a field programmable gate array (FPGA);

an X86 processor and a neural network-processing unit or neural-network processor (NPU);

an advanced RISC machine (ARM) processor;

an ARM processor and a GPU;

an ARM processor and an FPGA; and an ARM processor and an NPU.

For example, as shown in FIG. 1, the scaling group may have an instance 11 that uses the X86 processor, and may also have an instance 12 that uses the ARM processor. Similarly, the scaling group may also have other instances of different processor types, for example, an instance 13 that uses the X86 processor and an instance that uses both the X86 processor and the GPU.

An example of an implementation is that an instance that uses the X86 processor is created on a computing device with the X86 processor. An instance that uses the ARM processor is created on a computing device with the ARM processor. An instance that uses the X86 processor and the GPU is created on a computing device with both the X86 processor and the GPU. An instance that uses the ARM processor and the GPU is created on a computing device with both the ARM processor and the GPU. An instance that uses the X86 processor and the FPGA is created on a computing device with both the X86 processor and the FPGA. An instance that uses the ARM processor and the FPGA is created on a computing device with both the ARM processor and the FPGA. An instance that uses the X86 processor and the NPU is created on a computing device with both the X86 processor and the NPU. An instance that uses the ARM processor and the NPU is created on a computing device with both the ARM processor and the NPU. It should be learned that the computing device may be a server, or may be another device that has a computing capability.

Figure 2:
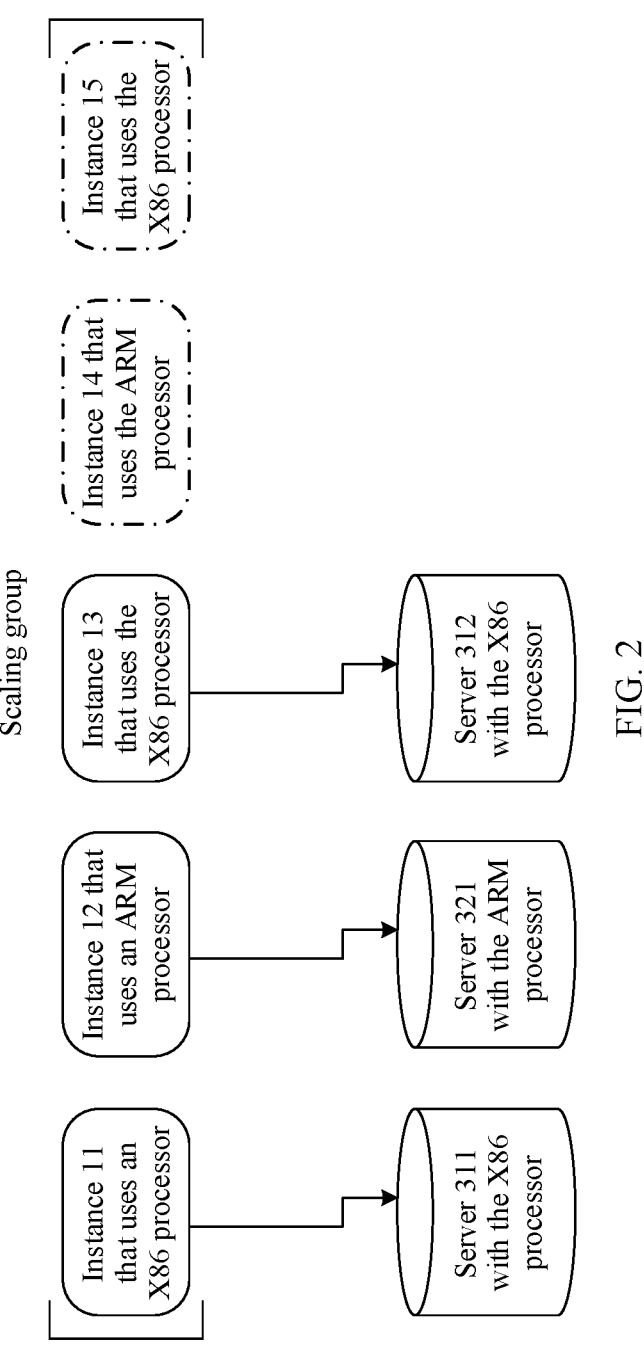
FIG. 2 is a schematic diagram of a scaling group according to an example of this application.

FIG. 1 and FIG. 2 are used as an example. The instance 11 that uses the X86 processor is created on a server 311 with the X86 processor, and the instance 12 that uses the ARM processor is created on a server 321 with the ARM processor. In addition, the instance that uses the ARM processor and the GPU is created on a server with both the ARM processor and the GPU.

One or more instance images are configured for the scaling group. In a possible implementation, the instance image records a specification of an instance, and the specification may record a processor type used by the instance. In a possible implementation, the instance image may further record application configuration expected to be deployed on the instance.

In a possible implementation of the instance image, the instance image may be an image used to create a container, or may be an image used to create a virtual machine, or may be an image used to create another entity that has a computing capability.

For example, a container image of the X86 processor is used to create a container that uses the X86 processor. For example, a container image of the ARM processor is used to create a container that uses the ARM processor. For example, a container image of the X86 processor and the GPU is used to create a container that uses the X86 processor and the GPU. For example, a container image of the ARM processor and the GPU is used to create a container that uses the ARM processor and the GPU. For example, a container image of the X86 processor and the FPGA is used to create a container that uses the X86 processor and the FPGA. For example, a container image of the ARM processor and the FPGA is used to create a container that uses the ARM processor and the FPGA. For example, a container image of the X86 processor and the NPU is used to create a container that uses the X86 processor and the NPU. A container image of the ARM processor and the NPU is used to create a container that uses the ARM processor and the NPU. A virtual machine image of the X86 processor is used to create a virtual machine that uses the X86 processor. For example, a virtual machine image of the ARM processor is used to create a virtual machine that uses the ARM processor. For example, a virtual machine image of the X86 processor and the GPU is used to create a virtual machine that uses the X86 processor and the GPU. For example, a virtual machine image of the ARM processor and the GPU is used to create a virtual machine that uses the ARM processor and the GPU. For example, a virtual machine image of the X86 processor and the FPGA is used to create a virtual machine that uses the X86 processor and the FPGA. For example, a virtual machine image of the ARM processor and the FPGA is used to create a virtual machine that uses the ARM processor and the FPGA. For example, a virtual machine image of the X86 processor and the NPU is used to create a virtual machine that uses the X86 processor and the NPU. A virtual machine image of the ARM processor and the NPU is used to create a virtual machine that uses the ARM processor and the NPU.

If one instance image is configured for the scaling group, instances of a same type may be created for the scaling group. For example, one instance image is specified for the scaling group. The instance image is the virtual machine image of the X86 processor. If a plurality of instances need to be added to the scaling group, the instance image may be used to create, for the scaling group, the virtual machine that uses the X86 processor.

If different instance images are configured for the scaling group, instances of different types may be created for the scaling group. For example, two instance images are specified for the scaling group. The two instance images are the virtual machine image of the X86 processor and the virtual machine image of the ARM processor. If a plurality of instances need to be added to the scaling group, the virtual machine that uses the X86 processor and the virtual machine that uses the ARM processor may be created for the scaling group.

In a possible implementation, different instance images may be configured for the scaling group at different time points. For example, when a scaling group is created, an instance image (for example, the virtual machine image of the X86 processor) used by the scaling group is specified. Then, when the scaling group is used, the instance image (for example, the virtual machine image of the ARM processor) used by the scaling group is updated, or the instance image used by the scaling group is increased.

In a possible implementation, a specification of an instance in the scaling group may be automatically scaled. Specifically, a specification of one instance in the scaling group is adjusted to another specification. For example, in the scaling group, a currently running specification of an instance is four X86 processors and a 64-gigabit (GB) memory. The specification of the instance may be reduced to two X86 processors and a 32 GB memory, or the specification of the instance may be increased to eight X86 processors and a 128 GB memory, or the specification of the instance may be adjusted to two X86 processors and a 128 GB memory, or the specification of the instance may be adjusted to eight X86 processors and a 32 GB memory.

A quantity of instances in the scaling group may be automatically scaled. For example, based on a service volume of an application provided by the scaling group, an instance of the application is added to the scaling group, or an instance of the application is reduced in the scaling group.

Auto scaling of the scaling group is triggered by a trigger condition. The trigger condition that may be used to trigger auto scaling is not limited in this application. In this specification, only some trigger conditions are provided by using examples. It should be learned that another trigger condition may be used to replace the trigger condition provided in this specification. The trigger conditions used for replacement also fall within the protection scope of this patent. For example, capacity expansion or capacity reduction may be periodically performed on the scaling group. For example, when a service volume supported by the scaling group increases, capacity expansion is performed on the scaling group to create more instances for the scaling group. For example, when a service volume supported by the scaling group decreases, capacity reduction is performed on the scaling group to remove a part of instances from the scaling group.

Figure 3:
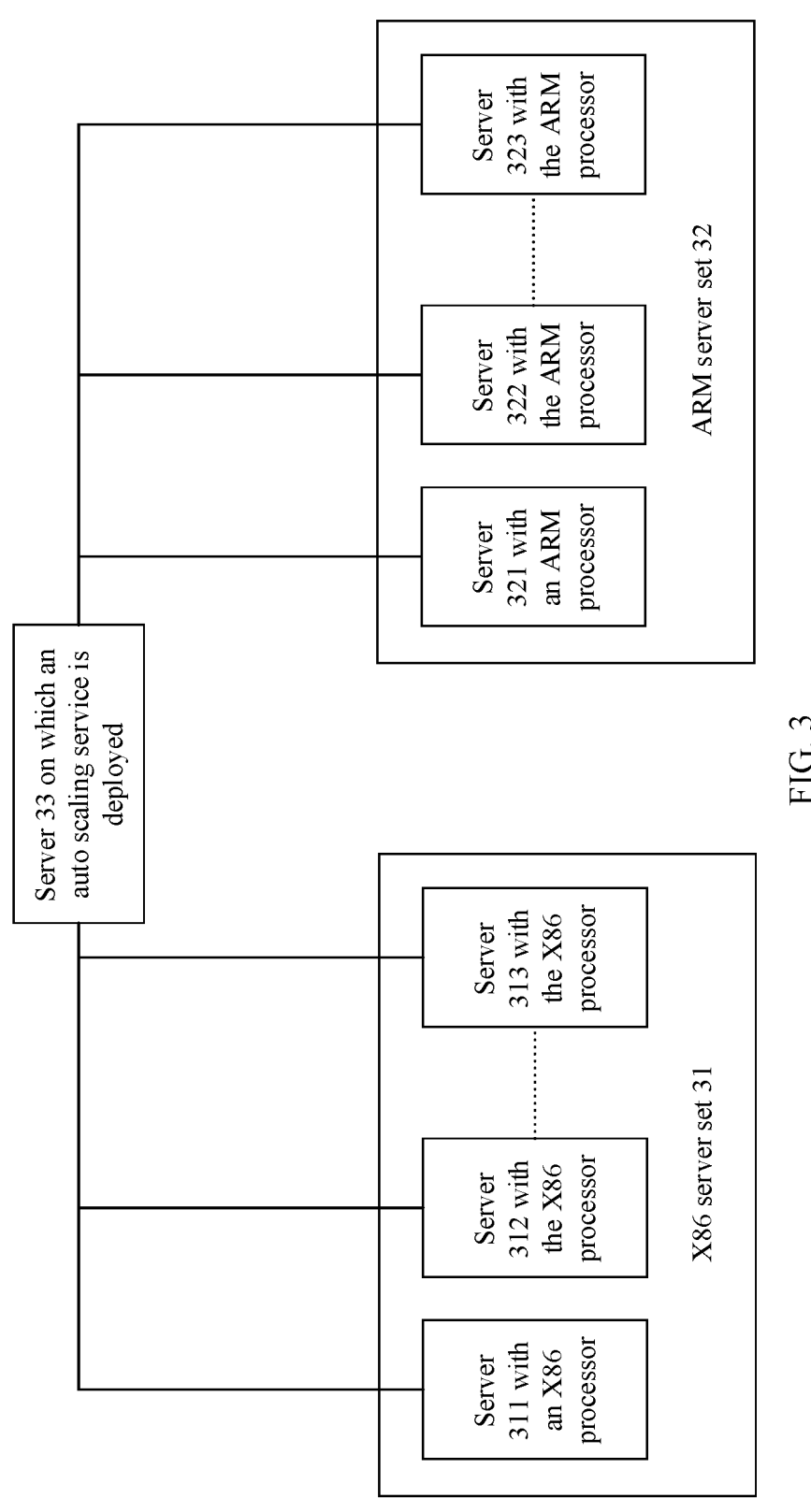
FIG. 3 is a schematic diagram of a capacity adjustment system according to an example of this application.

FIG. 3 provides an example of a system on which an auto scaling service is deployed.

As shown in FIG. 3, an X86 server set 31 includes one or more servers with the X86 processor, for example, a server 311, a server 312, and a server 313. The instance that uses the X86 processor may be deployed on the server (such as the server 311) with the X86 processor.

As shown in FIG. 3, an ARM server set 32 includes one or more servers with the ARM processor, for example, a server 321, a server 322, and a server 323. The instance that uses the ARM processor may be deployed on the server (such as the server 321) with the ARM processor.

As shown in FIG. 3, an auto scaling service is deployed on the server 33, and the auto scaling service may adjust a quantity of instances on the server with the X86 processor. For example, the auto scaling service may indicate to create, on the server 311, the instance 11 that uses the X86 processor, and the auto scaling service may indicate to remove, from the server 312, the instance 13 that uses the X86 processor. For example, the auto scaling service may indicate to create, on the server 321, the instance 12 that uses the ARM processor. For example, the auto scaling service may indicate to remove, from the server 323, the instance (for example, an instance 14) that uses the ARM processor. In a possible implementation, the auto scaling service deployed on the server 33 may indicate a virtualization platform to create an instance on or remove an instance from the server. In a possible implementation, the auto scaling service deployed on the server 33 may indicate an instance service provided by a cloud platform to create an instance or remove an instance for the scaling group.

Figure 4:
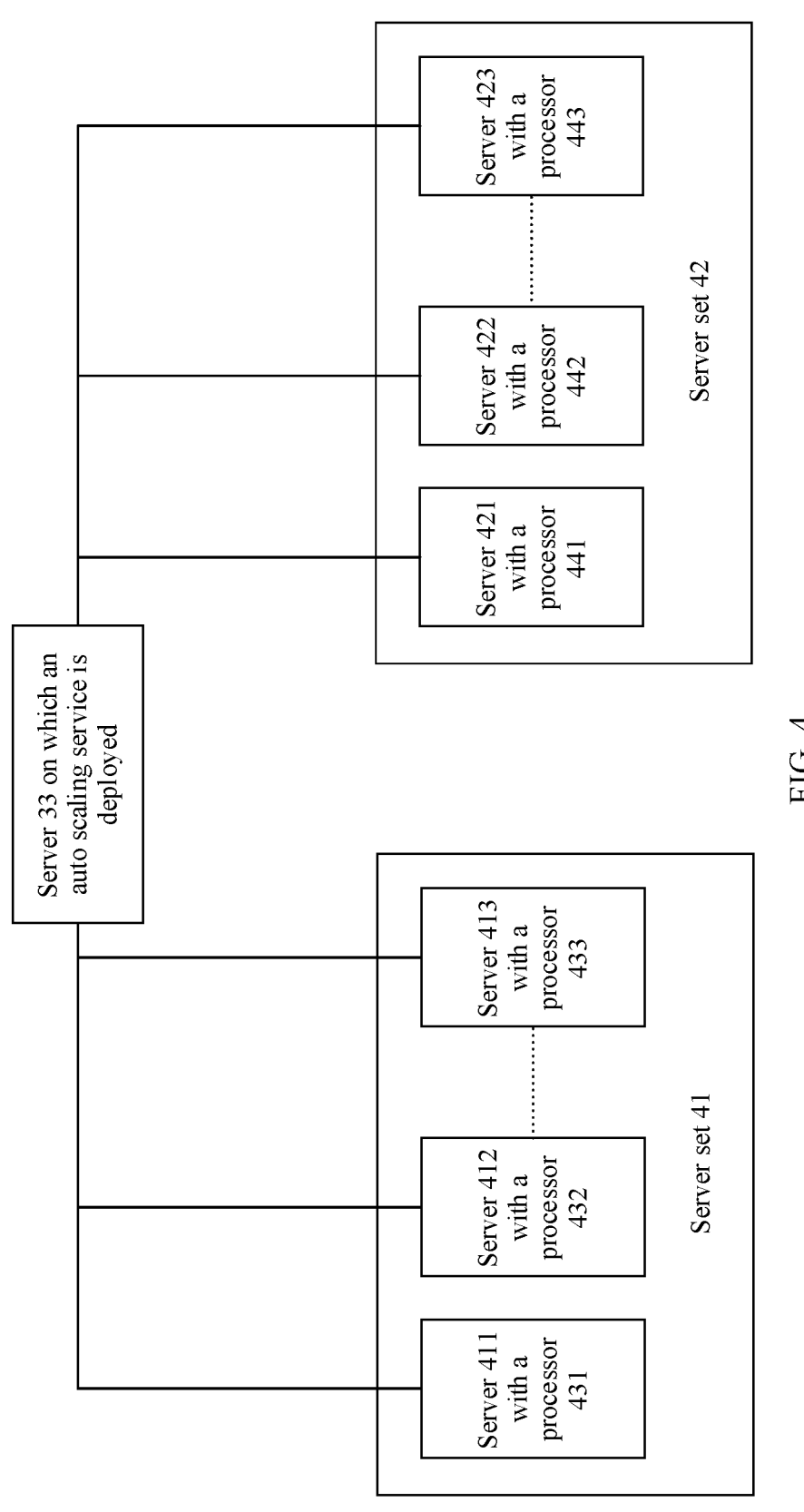
FIG. 4 is a schematic diagram of a capacity adjustment system according to an example of this application.

FIG. 3 is an example of server sets of different types. In this application, server sets to which servers belong may be determined based on different processor types. As shown in FIG. 4, server sets to which servers belong may be determined based on different processor specifications.

In FIG. 4, a processor 431 of a server 411, a processor 432 of a server 412, and a processor 433 of a server 413 are all processors of a same specification, for example, the processor 431, the processor 432, and the processor 433 are all Intel Xeon E7-8893 processors. In this way, the server 411, the server 412, and the server 413 that have processors of a same specification are used as a server set 41.

Similarly, a processor 441 of a server 421, a processor 442 of a server 422, and a processor 443 of a server 423 are all processors of a same specification, for example, the processor 441, the processor 442, and the processor 443 are all Intel Xeon Gold 6328 processors. In this way, the server 421, the server 422, and the server 423 that have processors of a same specification are used as a server set 42.

However, the server set 41 and the server set 42 separately have processors of different specifications. In other words, two servers with processors of a same specification are included in one server set. Naturally, two servers with processors of different specifications are included in two different server sets.

Different types of servers naturally have processors of different specifications. Therefore, two server sets of different types are naturally two server sets of different specifications. In a possible design, the X86 server set 31 shown in FIG. 3 is an example of the server set 41 shown in FIG. 4. Correspondingly, the ARM server set 32 shown in FIG. 3 is an example of the server set 42 shown in FIG. 4. In a possible design, the X86 processor is merely an example implementation of a CISC processor, the X86 server set 31 is merely an example of the server set 41, and the server set 41 may be a server set with another CISC processor. Similarly, the ARM server set 32 is merely an example of the server set 42, and the server set 42 may be a server set with another RISC processor.

Figures 5, 6:
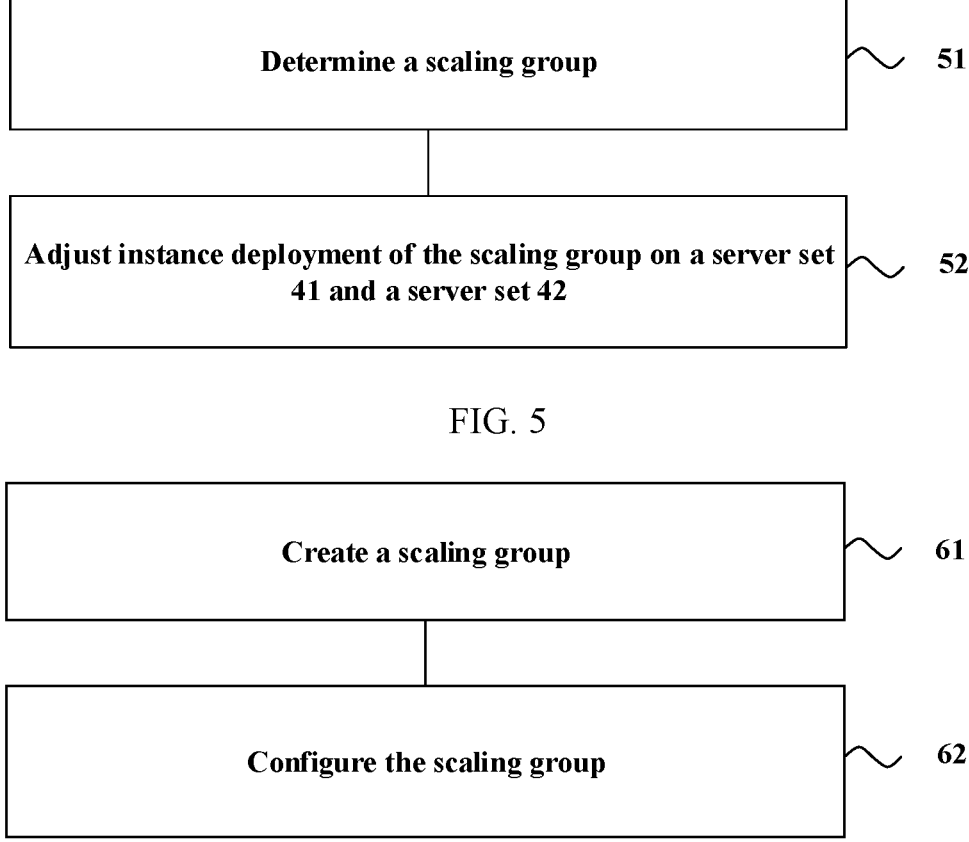
FIG. 5 is a schematic flowchart of a capacity adjustment method according to an example of this application.
FIG. 6 is a schematic flowchart of a capacity adjustment method according to an example of this application.

With reference to FIG. 1 to FIG. 4, the following describes a capacity adjustment method by using an example in FIG. 5. The method is an execution method for capacity adjustment. As shown in FIG. 5, the execution method includes at least step S51 and step S52.

Step S51. Determine a scaling group.

If an auto scaling service is deployed on a server 33, the auto scaling service on the server 33 determines the scaling group. If an auto scaling service is deployed on a plurality of servers 33 in a distributed manner, the server 33 that manages the scaling group determines whether to operate the scaling group.

In an example of a scenario, a user logs in to a console provided by a cloud platform, and uses, on the console, an auto scaling service provided by the cloud platform. The user may find a historically created scaling group by using the auto scaling service, so that the server 33 can also determine a scaling group.

The scaling group may include a plurality of instances that are separately deployed on different server sets of different processor specifications. For example, the scaling group has an instance that uses an Intel Xeon E7-8893 processor, and the instance is deployed (which is specifically deployed on a server with the E7-8893 processor) on a server set with the E7-8893 processor. The scaling group further has an instance that uses an Intel Xeon Gold 6328 processor, and the instance is deployed (which is specifically deployed on a server with the Gold 6328 processor) on a server set with the Gold 6328 processor.

The scaling group may include a plurality of instances that are separately deployed on heterogeneous server sets of different processor types. For example, the scaling group has an instance 13 that uses an X86 processor, and the instance 13 is deployed on a server 312 (belonging to an X86 server set 31) with the X86 processor. The scaling group has an instance 12 that uses an ARM processor, and the instance 12 is deployed on a server 321 (belonging to an ARM server set 32) with the ARM processor.

Step S52. Adjust instance deployment of the scaling group on a server set 41 and a server set 42.

If the instance in the scaling group is deployed on the server set 41 and the server set 42, after the auto scaling service on the server 33 determines to perform instance adjustment on the scaling group, instance adjustment is subsequently completed on the server set 41 and the server set 42, for example, a new instance is created, an old instance is removed, and a specification of an instance is adjusted.

An execution body of step S52 is not limited in this application, that is, a body controlled to complete instance adjustment on the server set 41 and the server set 42 is not limited, provided that the body can complete step S52. For example, the execution body of step S52 may be deployed on the cloud platform, and may specifically a service (for example, an instance service) or a functional module on the cloud platform. In a possible implementation, the auto scaling service completes instance adjustment on the server set 41 and the server set 42 in cooperation with a virtualization platform. In a possible implementation, the auto scaling service deployed on the server 33 may indicate an instance service provided by the cloud platform to complete instance adjustment on the server set 41 and the server set 42. In a possible implementation, the auto scaling service completes instance adjustment on the server set 41 and the server set 42 in cooperation with the cloud platform. In a possible implementation, the auto scaling service completes instance adjustment on the server set 41 and the server set 42.

The following describes how to perform capacity expansion on the scaling group on the server set 41 and the server set 42.

Capacity expansion is performed on the scaling group to obtain a plurality of instances that use processors of two different specifications (a first specification and a second specification). A first processor (for example, a processor 431, a processor 432, and a processor 433) of the first specification is in the server set 41, and a second processor (for example, a processor 441, a processor 442, and a processor 443) of the second specification is in the server set 42. In this way, an instance that uses the first processor of the first specification is created on the server set 41, and an instance that uses the second processor of the second specification is created on the server set 42.

When the instance that uses the first processor is created on the server set 41, an image that matches the first processor is used to create the instance for the scaling group. When the instance that uses the second processor is created on the server set 42, an image that matches the second processor is used to create the instance for the scaling group. For example, if the server set 41 has an E7-8893 processor, when an instance that uses the E7-8893 processor is created on the server set 41, an image that matches the E7-8893 processor is used to create the instance. For example, if the server set 42 has a Gold 6328 processor, when an instance that uses the Gold 6328 processor is created on the server set 42, an image that matches the Gold 6328 processor is used to create the instance.

In a possible implementation, if the first processor and the second processor are processors of a same type, a same image may be used to create an instance on the server set 41 and the server set 42 for the scaling group. For example, the server set 41 has an E7-8893 processor, the server set 42 has a Gold 6328 processor, and both the E7-8893 processor and the Gold 6328 processor are 64-bit X86 processors. Therefore, the two server sets may both support instance creation by using an image of the 64-bit X86 processor.

In a possible implementation, if the first processor and the second processor are processors of different types, a same image cannot be used to create an instance on the server set 41 and the server set 42 for the scaling group. For example, if the server set 41 has an X86 processor, and the server set 42 has an ARM processor, only an image that supports the X86 processor can be used to create an instance on the server set 41, and only an image that supports the ARM processor can be used to create an instance on the server set 42.

In a possible implementation, an instance is created on the server set 41 and the server set 42 for the scaling group based on a ratio. The ratio may be preset, may be set by the user, or may be set by a system. For example, it is assumed that the ratio is 1:3. If eight instances are expected to be added to the scaling group, two instances are created on the server set 41, and six instances are created on the server set 42.

In a possible implementation, when capacity expansion is performed on the scaling group, an instance is created only on the server set 41 for the scaling group. Correspondingly, no instance is created on the server set 42 for the scaling group.

In a possible implementation, when capacity expansion is performed on the scaling group, an instance is created only on the server set 42 for the scaling group. Correspondingly, no instance is created on the server set 41 for the scaling group.

The following describes how to perform capacity reduction on the scaling group on the server set 41 and the server set 42.

An instance to be removed from the scaling group is selected from each of the server set 41 and the server set 42. Specifically, the instance to be removed from the scaling group is determined from an instance deployed on the server set 41. Correspondingly, the instance to be removed from the scaling group is determined from an instance deployed on the server set 42. In the scaling group, instances that use processors of different specifications or even instances that use processors of different types are separately deployed on the server set 41 and the server set 42.

For example, the to-be-removed instance is determined, based on a ratio, from each of the instance deployed on the server set 41 and the instance deployed on the server set 42.

The ratio may be preset, may be set by the user, or may be set by a system. For example, it is assumed that the ratio is 1:3. If eight instances are expected to be removed from the scaling group, two to-be-removed instances are determined from the instance deployed on the server set 41, and six to-be-removed instances are determined from the instance deployed on the server set 42.

In a possible implementation, when capacity reduction is performed on the scaling group, an instance to be removed from the scaling group is determined only from the instance deployed on the server set 41. Correspondingly, no instance to be removed from the scaling group is determined from the instance deployed on the server set 42.

In a possible implementation, when capacity reduction is performed on the scaling group, an instance to be removed from the scaling group is determined only from the instance deployed on the server set 42. Correspondingly, no instance to be removed from the scaling group is determined from the instance deployed on the server set 41.

In a possible application scenario, instance costs of instance deployment on the server set 41 are higher than instance costs of instance deployment on the server set 42. In other words, the instance costs of instance deployment on the server set 42 are lower than the instance costs of instance deployment on the server set 41.

When capacity expansion is performed on the scaling group, more instances are created on the server set 42 with low instance costs than the server set 41 with high instance costs, or even no instance may be created on the server set 41. For example, three instances are created on the server set 42, and only one instance is created on the server set 41. In this way, it can be ensured that instance costs of the scaling group are low.

When capacity reduction is performed on the scaling group, more instances to be removed from the scaling group are determined from the server set 41 with high instance costs than the server set 42 with low instance costs, or even no to-be-removed instance may be determined from the instance deployed on the server set 42. For example, three to-be-removed instances are determined from the server set 41, and only one to-be-removed instance is determined from the server set 42. In this way, instance costs of the scaling group can be reduced.

In a possible application scenario, instance performance of instance deployment on the server set 41 is lower than instance performance of instance deployment on the server set 42. Instance performance of instance deployment on the server set 42 is higher than instance performance of instance deployment on the server set 41.

When capacity expansion is performed on the scaling group, more instances are created on the server set 42 with high instance performance than the server set 41 with low instance performance, or even no instance may be created on the server set 41. For example, three instances that use the ARM processor are created on the server set 42, and only one instance that uses the X86 processor is created on the server set 41. In this way, more high-performance instances can be added to the scaling group.

When capacity reduction is performed on the scaling group, more instances to be removed from the scaling group are determined from the server set 41 with low instance performance than the server set 42 with high instance performance, or even no to-be-removed instance may be determined from the instance deployed on the server set 42. For example, three to-be-removed instances are determined from the server set 41, and only one to-be-removed instances are determined from the server set 42. In this way, more low-performance instances are removed from the scaling group, to ensure overall performance of an instance in the scaling group.

In a possible application scenario, resource utilization of instance deployment on the server set 41 is higher than resource utilization of instance deployment on the server set 42. Resource utilization of instance deployment on the server set 42 is lower than resource utilization of instance deployment on the server set 41.

When capacity expansion is performed on the scaling group, more instances are created on the server set 42 with low resource utilization than the server set 41 with high resource utilization, or even no instance may be created on the server set 41. For example, three instances that use the ARM processor are created on the server set 42, and only one instance that uses the X86 processor is created on the server set 41. In this way, more high-performance instances can be added to the scaling group.

When capacity reduction is performed on the scaling group, more instances to be removed from the scaling group are determined from the server set 41 with high resource utilization than the server set 42 with low resource utilization, or even no to-be-removed instance may be determined from the server set 42. For example, three to-be-removed instances are determined from the server set 41, and only one to-be-removed instance is determined from the server set 42. In this way, more low-performance instances with a small quantity of available resources are removed from the scaling group, to ensure overall performance of an instance in the scaling group.

In a possible application scenario, a quantity of instances deployed on the server set 41 for the scaling group has an upper limit value. For example, the upper limit value of the quantity of instances deployed on the server set 41 for the scaling group is 3. When capacity expansion is performed on the scaling group, if one instance is deployed on each of a server 411 and a server 412, a maximum of one new instance may be created on the server set 41 (for example, a server 413) during current capacity expansion. In this way, the upper limit value may be used to limit resource occupation on the server set 41 by an instance in the scaling group.

In a possible application scenario, a quantity of instances deployed on the server set 41 for the scaling group has a lower limit value. For example, the lower limit value of the quantity of instances deployed on the server set 41 for the scaling group is 1. When capacity reduction is performed on the scaling group, if one instance has been deployed on each of a server 411 and a server 412, a maximum of one instance may be removed, during current capacity reduction, from the two instances deployed on the server set 41, and the instance may be one instance deployed on the server 411, or may be one instance deployed on the server 412. In this way, the lower limit value may be used to ensure resource occupation on the server set 41 by an instance in the scaling group, for example, this method is applicable to a scenario in which instance performance of an instance is higher on the server set 41 than the server set 42.

In a possible application scenario, a quantity of instances deployed on the server set 42 for the scaling group has an upper limit value. For example, the upper limit value of the quantity of instances deployed on the server set 42 for the scaling group is 4. When capacity expansion is performed on the scaling group, if one instance is deployed on each of a server 421 and a server 422, a maximum of two new instances may be created on the server set 42 (for example, a server 423) during current capacity expansion. In this way, the upper limit value may be used to limit resource occupation on the server set 42 by an instance in the scaling group.

In a possible application scenario, a quantity of instances deployed on the server set 42 for the scaling group has a lower limit value. For example, the lower limit value of the quantity of instances deployed on the server set 42 for the scaling group is 2. When capacity reduction is performed on the scaling group, if two instances have been deployed on each of a server 421 and a server 422, a maximum of two instances may be removed, during current capacity reduction, from the four instances deployed on the server set 42, and the instances may be two instances deployed on the server 421, or may be two instances deployed on the server 422, or may be one instance deployed on the server 421 and one instance deployed on the server 422. In this way, the lower limit value may be used to ensure resource occupation on the server set 42 by an instance in the scaling group, for example, this method is applicable to a scenario in which instance performance of the scaling group is ensured.

In a possible application scenario, the scaling group includes an instance of a virtual machine type. To be specific, an instance included in the scaling group is an instance of the virtual machine type. The instance deployed on the server set 41 for the scaling group is of the virtual machine type, and the instance deployed on the server set 42 for the scaling group is also of the virtual machine type.

In a possible application scenario, the scaling group includes an instance of a container type. To be specific, an instance included in the scaling group is an instance of the container type. The instance deployed on the server set 41 for the scaling group is of the container type, and the instance deployed on the server set 42 for the scaling group is also of the container type.

In a possible application scenario, the scaling group includes an instance of a virtual machine type and an instance of a container type. To be specific, a part of instances included in the scaling group are instances of the virtual machine type, and another part of instances included in the scaling group are instances of the container type. For example, the instance deployed on the server set 41 for the scaling group is of the virtual machine type, and the instance deployed on the server set 42 for the scaling group is of the container type. For example, the instance of the virtual machine type is deployed on the server set 41 for the scaling group, the instance of the container type is further deployed on the server set 41 for the scaling group, and the instance of the virtual machine type or the container type is deployed on the server set 42.

With reference to FIG. 1 to FIG. 5, the following describes a capacity adjustment method by using an example in FIG. 6. The method is a configuration method for capacity adjustment. As shown in FIG. 6, the configuration method includes at least step S61 and step S62.

Step S61. Create a scaling group.

If an auto scaling service is deployed on a server 33, the auto scaling service on the server 33 creates the scaling group. If an auto scaling service is deployed on a plurality of servers 33 in a distributed manner, the server 33 that manages the scaling group determines whether to operate the scaling group.

In an example of a scenario, a user logs in to a console provided by a cloud platform, and uses, on the console, an auto scaling service provided by the cloud platform. The user may create a new scaling group by using the auto scaling service. Subsequently, the user may find the scaling group by using the auto scaling service, and update configuration of the scaling group.

As shown in FIG. 7, after the scaling group is created by using the auto scaling service, the scaling group may be configured. For example, the user may configure a scaling group name for the scaling group. For example, the user may configure a maximum instance quantity and a minimum instance quantity for the scaling group. The maximum instance quantity is a maximum quantity of instances that the scaling group may have, and the minimum instance quantity is a minimum quantity of instances that the scaling group may have.

Step S62. Configure the scaling group.

For configuration of the scaling group, the user may configure to deploy an instance on a server set 41 and a server set 42 for the scaling group. The server set 41 and the server set 42 may use processors of different specifications. After the user performs configuration, the auto scaling service on the server 33 creates an instant on the server set 41 and the server set 42 for the scaling group, and the auto scaling service on the server 33 determines to subsequently adjust instance deployment of the scaling group on the server set 41 and the server set 42.

For example, FIG. 7 is used as an example. The user may select a server resource used to deploy an instance for the scaling group, for example, may select an X86 server set 31 and an ARM server set 32. Referring to FIG. 3, the X86 server set 31 uses an X86 processor, and the ARM server set 32 uses an ARM processor. Therefore, the X86 server set 31 and the ARM server set 32 use processors of different types, and the processors of different types are necessarily processors of different specifications.

In a possible implementation, for configuration of the scaling group, the user may configure an instance image used to create an instance on the server set 41 for the scaling group. Correspondingly, the auto scaling service on the server 33 determines the instance image used to create an instance on the server set 41. Similarly, the user may configure an instance image used to create an instance on the server set 42 for the scaling group. Correspondingly, the auto scaling service on the server 33 determines the instance image used to create an instance on the server set 42.

For example, FIG. 7 is used as an example. The user selects an X86 server set 31 and an ARM server set 32. The user may further select an X86 instance image used to create an instance on the X86 server set 31. Similarly, the user may further select an ARM instance image used to create an instance on the ARM server set 31. In this way, the auto scaling service on the server 33 determines that the X86 instance image is used to create an instance on the X86 server set 31 for the scaling group, and the auto scaling service on the server 33 determines that the ARM instance image is used to create an instance on the ARM server set 32 for the scaling group. Subsequently, when capacity expansion is performed on the scaling group, an instance is created on the X86 server set 31 for the scaling group by using the X86 instance image, and an instance is created on the ARM server set 32 for the scaling grouping by using the ARM instance image.

In a possible implementation, for configuration of the scaling group, the user may configure an instance image used to create an instance on both the server set 41 and the server set 42 for the scaling group. Correspondingly, the auto scaling service on the server 33 determines the instance image jointly used to create an instance on the server set 41 and the server set 42.

In a possible implementation, for configuration of the scaling group, the user may configure to create an instance on a server set with low instance costs. For example, through comparison between the server set 41 and the server set 42, if instance costs of instance deployment on the server set 41 are higher than instance costs of instance deployment on the server set 42, more instances are created on the server set 42 with low instance costs than the server set 41 with high instance costs, or even no instance may be created on the server set 41. On the contrary, if instance costs of instance deployment on the server set 41 are lower than instance costs of instance deployment on the server set 42, more instances are created on the server set 41 with low instance costs than the server set 42 with high instance costs, or even no instance may be created on the server set 42. In this way, the auto scaling service on the server 33 determines to create an instance on the server set (the server set 41 or the server set 42) with low instance costs.

In a possible implementation, for configuration of the scaling group, the user may configure to create an instance on a server set with high instance performance. For example, through comparison between the server set 41 and the server set 42, if instance performance of instance deployment on the server set 41 is higher than instance performance of instance deployment on the server set 42, more instances are created on the server set 41 than the server set 42, or even no instance may be created on the server set 42. On the contrary, if instance performance of instance deployment on the server set 42 is higher than instance performance of instance deployment on the server set 41, more instances are created on the server set 42 with high instance performance than the server set 41 with low instance performance, or even no instance may be created on the server set 41. In this way, the auto scaling service on the server 33 determines to create an instance on the server set (the server set 41 or the server set 42) with high instance performance.

In a possible implementation, for configuration of the scaling group, the user may configure to create an instance on a server set with low resource utilization. For example, through comparison between the server set 41 and the server set 42, if resource utilization of instance deployment on the server set 41 is higher than resource utilization of instance deployment on the server set 42, more instances are created on the server set 42 with low resource utilization than the server set 41 with high resource utilization, or even no instance may be created on the server set 41. On the contrary, if resource utilization of instance deployment on the server set 41 is lower than resource utilization of instance deployment on the server set 42, more instances are created on the server set 41 with low resource utilization than the server set 42 with high resource utilization, or even no instance may be created on the server set 42. In this way, the auto scaling service on the server 33 determines to create an instance on the server set (the server set 41 or the server set 42) with low resource utilization.

In a possible implementation, for configuration of the scaling group, the user may configure a ratio, for example, select one ratio from a plurality of ratios provided in a configuration item of the scaling group. The ratio is a ratio between a quantity of instances on server sets 41 and a quantity of instances on server sets 42. Correspondingly, the auto scaling service on the server 33 determines the ratio. Subsequently, regardless of whether capacity expansion is performed on the scaling group or capacity reduction is performed on the scaling group, the ratio between the quantity of instances on server sets 41 and the quantity of instances on server sets 42 is maintained at the configured ratio or is maintained near the configured ratio.

In a possible implementation, for configuration of the scaling group, the user may manually input a ratio. Correspondingly, the auto scaling service on the server 33 determines the ratio. Subsequently, regardless of whether capacity expansion is performed on the scaling group or capacity reduction is performed on the scaling group, a ratio between a quantity of server sets 41 and a quantity of server sets 42 is maintained at the configured ratio or is maintained near the configured ratio.

In a possible implementation, a removal policy is configured for the scaling group, and the removal policy is used to determine a to-be-removed instance when capacity reduction is performed on the scaling group. The following provides several removal policies by using an example.

A removal policy is to determine a to-be-removed instance from an instance deployed on the server set 41.

A removal policy is to determine a to-be-removed instance from an instance deployed on the server set 42.

A removal policy is to determine a to-be-removed instance from an instance deployed on the server set 41 and an instance deployed on the server set 42.

A removal policy is to remove an instance with lowest performance.

A removal policy is to remove an earliest created instance.

A removal policy is to remove a newly created instance.

A removal policy is to remove an instance from a server set (the server set 41 or the server set 42) with high instance costs. For example, through comparison between the server set 41 and the server set 42, if instance costs of instance deployment on the server set 41 are higher than instance costs of instance deployment on the server set 42, the removal policy is to determine a to-be-removed instance from an instance deployed on the server set 41. On the contrary, if instance costs of instance deployment on the server set 41 are lower than instance costs of instance deployment on the server set 42, the removal policy is to determine a to-be-removed instance from an instance deployed on the server set 42.

A removal policy is to remove an instance from a server set (the server set 41 or the server set 42) with low instance performance. For example, through comparison between the server set 41 and the server set 42, if instance performance of instance deployment on the server set 41 is higher than instance performance of instance deployment on the server set 42, the removal policy is to determine a to-be-removed instance from an instance deployed on the server set 42. On the contrary, if instance performance of instance deployment on the server set 41 is lower than instance performance of instance deployment on the server set 42, the removal policy is to determine a to-be-removed instance from an instance deployed on the server set 41.

A removal policy is to remove an instance from a server set (the server set 41 or the server set 42) with high resource utilization. For example, through comparison between the server set 41 and the server set 42, if resource utilization of the server set 41 is higher than resource utilization of the server set 42, the removal policy is to determine a to-be-removed instance from an instance deployed on the server set 41. On the contrary, if resource utilization of the server set 41 is lower than resource utilization of the server set 42, the removal policy is to determine a to-be-removed instance from an instance deployed on the server set 42.

When the scaling group is configured, only one removal policy may be selected. In this way, when capacity reduction is performed on the scaling group, the auto scaling service on the server 33 determines a to-be-removed instance only based on the removal policy. For example, FIG. 7 is used as an example. After a removal policy "Instance deployed on an X86 server set 31" is selected, when capacity reduction is subsequently performed on the scaling group, a to-be-removed instance is determined only from the instance deployed on the X86 server set 31. For example, FIG. 7 is used as an example. After a removal polity "Instance deployed on an X86 server set 31 and instance deployed on an ARM server set 32" is selected, when capacity reduction is subsequently performed on the scaling group, a to-be-removed instance is determined from the instance deployed on the X86 server set 31, and a to-be-removed instance is further determined from the instance deployed on the ARM server set 32.

When the scaling group is configured, a plurality of removal policies may be selected. In this way, when capacity reduction is performed on the scaling group, the auto scaling service on the server 33 considers the removal policies together, and determines, as a to-be-removed instance, an instance that meets all the removal policies. For example, FIG. 7 is used as an example. After two removal policies "Instance deployed on an X86 server set 31" and "Instance with lowest instance performance" are selected, when capacity reduction is subsequently performed on the scaling group, an instance with lowest instance performance is determined as a to-be-removed instance from the instance deployed on the X86 server set 31.

In a possible implementation, for configuration of the scaling group, the user may specify an instance type for the scaling group. For example, the user may specify that an instance of a virtual machine type is deployed for the scaling group. For example, the user may specify that an instance of a container type is deployed for the scaling group. For example, the user may specify that both an instance of a virtual machine type and an instance of a container type are deployed for the scaling group. In this way, when capacity expansion is performed on the scaling group, an instance is created on the server set 41 or the server set 42 for the scaling group based on a configured type.

In a possible implementation, for configuration of the scaling group, the user may specify an upper limit value of a quantity of instances deployed on a server set (the server set 41 or the server set 42) for the scaling group. For example, the user specifies that an upper limit value of a quantity of instances deployed on the server set 41 for the scaling group is 5, and an upper limit value of a quantity of instances deployed on the server set 42 for the scaling group is 8. In this way, the auto scaling service on the server 33 determines the upper limit value of the quantity of instances deployed on the server set (the server set 41 or the server set 42) for the scaling group.

In a possible implementation, for configuration of the scaling group, the user may specify a lower limit value of a quantity of instances deployed on a server set (the server set 41 or the server set 42) for the scaling group. In this way, the auto scaling service on the server 33 determines the lower limit value of the quantity of instances deployed on the server set (the server set 41 or the server set 42) for the scaling group.

This application further provides a capacity adjustment apparatus. The apparatus may be deployed on a computing device (for example, a server 33) in this application. The apparatus includes a functional unit configured to implement the foregoing capacity adjustment method. How to divide the apparatus to obtain a functional unit is not limited in this application.

Figure 8:
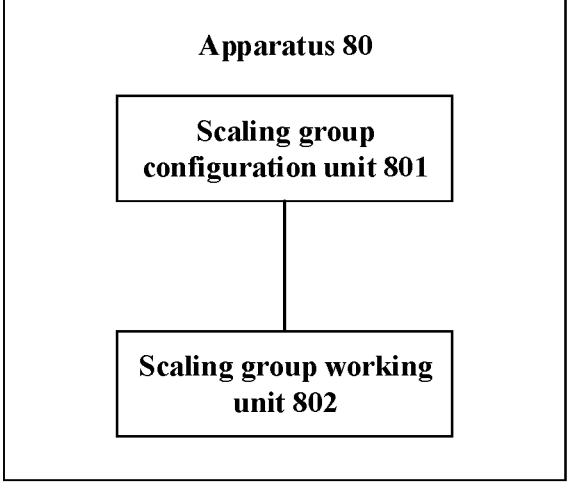
FIG. 8 is a schematic diagram of a logical structure of a capacity adjustment apparatus 800 according to an example of this application.

As shown in FIG. 8, the following provides example division of the apparatus to obtain a functional unit.

An apparatus 80 shown in FIG. 8 includes a scaling group configuration unit 801 and a scaling group working unit 802.

The scaling group configuration unit 801 is configured to implement the configuration method for capacity adjustment provided in this application, for example, perform step S61 and step S62 shown in FIG. 6. The scaling group working unit 802 is configured to implement the execution method for capacity adjustment provided in this application, for example, perform step S51 and step S52 shown in FIG. 5.

Figure 9:
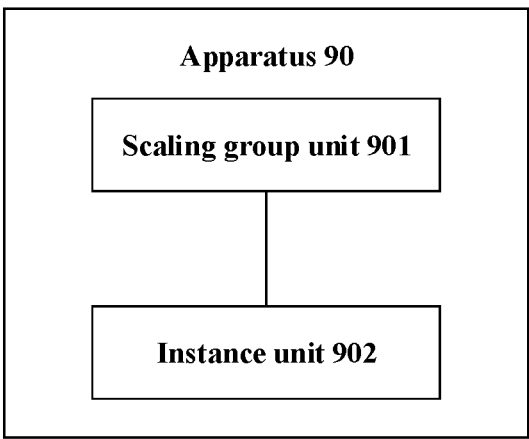
FIG. 9 is a schematic diagram of a logical structure of a capacity adjustment apparatus 900 according to an example of this application.

As shown in FIG. 9, the following provides another example division of the apparatus to obtain a functional unit.

An apparatus 90 shown in FIG. 9 includes:

a scaling group unit 901, configured to create a scaling group; and an instance unit 902, configured to: create a first instance on a first server set for the scaling group, and create a second instance on a second server set for the scaling group, where a quantity of instances deployed on the first server set for the scaling group is limited by an upper limit value.

In a possible design of the apparatus 90, the quantity of instances deployed on the first server set for the scaling group is limited by a lower limit value; a quantity of instances deployed on the second server set for the scaling group is limited by an upper limit value; a quantity of instances deployed on the second server set for the scaling group is limited by a lower limit value; or a quantity of instances deployed on the second server set for the scaling group is limited by an upper limit value and a lower limit value.

In a possible design of the apparatus 90, the first server set with an X86 processor is configured to create the first instance that uses the X86 processor. The second server set with an ARM processor is configured to create the second instance that uses the ARM processor.

In a possible design of the apparatus 90, the scaling group includes a third instance and a fourth instance, the third instance is an instance of a virtual machine type, and the fourth instance is an instance of a container type.

In a possible design of the apparatus 90, an instance image used to create an instance on the first server set is different from an instance image used to create an instance on the second server set.

In a possible design of the apparatus 90, the instance unit 902 is configured to adjust instance deployment of the scaling group on the first server set and the second server set.

In a possible design of the apparatus 90, the instance unit 902 is configured to: create an instance on the first server set with low instance costs; or remove an instance from the second server set with high instance costs.

In a possible design of the apparatus 90, the instance unit 902 is configured to: create an instance on the second server set with high instance performance; or remove an instance from the first server set with low instance performance.

In a possible design of the apparatus 90, the instance unit 902 is configured to: create an instance on the second server set with low resource utilization; or remove an instance from the first server set with high resource utilization.

In a possible design of the apparatus 90, the quantity of instances deployed on the first server set for the scaling group and the quantity of instances deployed on the second server set for the scaling group are maintained at a ratio or near the ratio.

Figure 10:
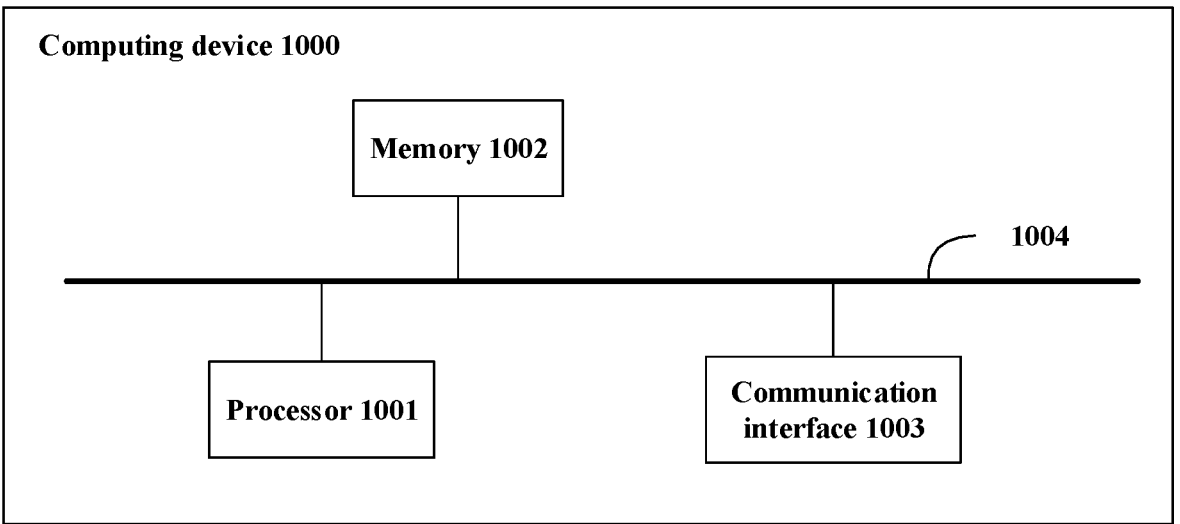
FIG. 10 is a schematic diagram of a structure of a computing device 1000 according to an example of this application.

Optionally, FIG. 10 schematically provides a possible basic hardware architecture of a computing device according to this application.

Referring to FIG. 10, a computing device 1000 includes a processor 1001, a memory 1002, a communication interface 1003, and a bus 1004.

In the computing device 1000, there may be one or more processors 1001. FIG. 10 shows only one processor 1001. Optionally, the processor 1001 may be a central processing unit (CPU). If the computing device 1000 includes a plurality of processors 1001, the plurality of processors 1001 may be of a same type or different types. Optionally, the plurality of processors 1001 of the computing device 1000 may be integrated into a multi-core processor.

The memory 1002 stores instructions and data. The memory 1002 may store instructions and data that are required to implement the capacity adjustment method provided in this application. The memory 1002 may be any one or any combination of the following storage media: a nonvolatile memory (for example, a read-only memory (ROM), a solid state disk (SSD), a hard disk (HDD), or an optical disc) and a volatile memory.

The communication interface 1003 may be any one or any combination of the following components with a network access function, such as a network interface (for example, an Ethernet interface) and a wireless network interface card.

The communication interface 1003 is configured to perform data communication between the computing device 1000 and another computing device or a terminal.

A thick line is used to represent the bus 1004 in FIG. 10. The bus 1004 may connect the processor 1001 and the memory 1002 to the communication interface 1003. In this way, the processor 1001 may access the memory 1002 by using the bus 1004, and may further exchange data with another computing device or terminal by using the communication interface 1003.

In this application, the computing device 1000 executes the instructions in the memory 1002, so that the computing device 1000 implements the capacity adjustment method provided in this application.

For example, in the method shown in FIG. 3 or FIG. 4, the computing device 1000 may be configured as the server 33 on which an auto scaling service is deployed. When the computing device 1000 executes the instructions in the memory 1002, the computing device 1000 performs step S51 and step S22, or the computing device 1000 performs step S61 and step S62.

This application provides a computer-readable storage medium. The computer-readable storage medium stores instructions. When a processor 1001 of a computing device 1000 executes the instructions, the computing device 1000 performs steps of the foregoing capacity adjustment method.

This application provides a computer program product. The computer program product includes instructions. The instructions are stored in a computer-readable storage medium. A processor 1001 of a computing device 1000 may read the instructions from the computer-readable storage medium. The processor 1001 executes the instructions, so that the computing device 1000 performs steps of the foregoing capacity adjustment method.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments, without departing from the protection scope of the claims.

What is claimed is:

1. A capacity adjustment method, wherein the capacity adjustment method comprises:
creating a scaling group;
creating a first instance on a first server set for the scaling group; and
creating a second instance on a second server set for the scaling group, wherein a quantity of instances deployed on the first server set for the scaling group is limited by a first upper limit value,
wherein an instance image used to create the first instance is different from an instance image used to create the second instance, and wherein the instance image records application configuration expected to be deployed on the instance, and
wherein the quantity of instances deployed on the first server set for the scaling group and the quantity of instances deployed on the second server set for the scaling group are maintained at a ratio.

2. The capacity adjustment method according to claim 1, wherein:
the quantity of instances deployed on the first server set for the scaling group is limited by a first lower limit value; and wherein:
a quantity of instances deployed on the second server set for the scaling group is limited by a second upper limit value; or
a quantity of instances deployed on the second server set for the scaling group is limited by a second lower limit value.

3. The capacity adjustment method according to claim 1, wherein:
a processor of a server in the first server set is a reduced instruction set computer (RISC) processor; and
a processor of a server in the second server set is a complex instruction set computer (CISC) processor.

4. The capacity adjustment method according to claim 1, wherein:
the scaling group comprises a third instance and a fourth instance, the third instance is an instance of a virtual machine type, and the fourth instance is an instance of a container type.

5. The capacity adjustment method according to claim 1, wherein the capacity adjustment method comprises:
adjusting instance deployment of the scaling group on the first server set and the second server set.

6. The capacity adjustment method according to claim 5, wherein the adjusting instance deployment of the scaling group on the first server set and the second server set comprises:
creating an instance on the first server set with low instance costs; or
removing an instance from the second server set with high instance costs.

7. The capacity adjustment method according to claim 5, wherein the adjusting instance deployment of the scaling group on the first server set and the second server set comprises:
creating an instance on the second server set with high instance performance; or
removing an instance from the first server set with low instance performance.

8. The capacity adjustment method according to claim 5, wherein the adjusting instance deployment of the scaling group on the first server set and the second server set comprises:

creating an instance on the second server set with low resource utilization; or removing an instance from the first server set with high resource utilization.

9. A computing device, comprising:

one or more processors; and a non-transitory computer readable medium storing one or more instructions that when executed by the one or more processors, cause the computing device to perform operations comprising:

creating a scaling group; and creating a first instance on a first server set for the scaling group, and create a second instance on a second server set for the scaling group, wherein a quantity of instances deployed on the first server set for the scaling group is limited by a first upper limit value, wherein an instance image used to create the first instance is different from an instance image used to create the second instance, and wherein the instance image records application configuration expected to be deployed on the instance, and wherein the quantity of instances deployed on the first server set for the scaling group and the quantity of instances deployed on the second server set for the scaling group are maintained at a ratio.

10. The computing device according to claim 9, wherein: the quantity of instances deployed on the first server set for the scaling group is limited by a first lower limit value; and wherein:

a quantity of instances deployed on the second server set for the scaling group is limited by a second upper limit value; or a quantity of instances deployed on the second server set for the scaling group is limited by a second lower limit value.

11. The computing device according to claim 9, wherein: a processor of a server in the first server set is a reduced instruction set computer (RISC) processor; and a processor of a server in the second server set is a complex instruction set computer (CISC) processor.

12. The computing device according to claim 9, wherein the scaling group comprises a third instance and a fourth instance, the third instance is an instance of a virtual machine type, and the fourth instance is an instance of a container type.

13. The computing device according to claim 9, wherein the operations further comprise adjusting instance deployment of the scaling group on the first server set and the second server set.

14. The computing device according to claim 13, wherein adjusting the instance deployment of the scaling group on the first server set and the second server set comprises:

creating an instance on the first server set with low instance costs; or removing an instance from the second server set with high instance costs.

15. The computing device according to claim 13, wherein adjusting the instance deployment of the scaling group on the first server set and the second server set comprises:

creating an instance on the second server set with high instance performance; or removing an instance from the first server set with low instance performance.

16. The computing device according to claim 13, wherein adjusting the instance deployment of the scaling group on the first server set and the second server set comprises:

creating an instance on the second server set with low resource utilization; or removing an instance from the first server set with high resource utilization.

17. A non-transitory computer-readable storage medium storing one or more instructions executable by a computer system to perform operations comprising:

creating a scaling group;

creating a first instance on a first server set for the scaling group; and creating a second instance on a second server set for the scaling group, wherein a quantity of instances deployed on the first server set for the scaling group is limited by a first upper limit value, wherein an instance image used to create the first instance is different from an instance image used to create the second instance, and wherein the instance image records application configuration expected to be deployed on the instance, and wherein the quantity of instances deployed on the first server set for the scaling group and the quantity of instances deployed on the second server set for the scaling group are maintained at a ratio.

18. The non-transitory computer-readable storage medium according to claim 17, wherein:

the quantity of instances deployed on the first server set for the scaling group is limited by a first lower limit value; and wherein:

a quantity of instances deployed on the second server set for the scaling group is limited by a second upper limit value; or a quantity of instances deployed on the second server set for the scaling group is limited by a second lower limit value.

19. The non-transitory computer-readable storage medium according to claim 17, wherein the operations further comprise adjusting instance deployment of the scaling group on the first server set and the second server set.

20. The non-transitory computer-readable storage medium according to claim 19, wherein the adjusting instance deployment of the scaling group on the first server set and the second server set comprises:

creating an instance on the first server set with low instance costs; or removing an instance from the second server set with high instance costs.

* * * * *